United States Patent [19]

Preston et al.

[11] Patent Number: 5,402,928

[45] Date of Patent: Apr. 4, 1995

[54] METHOD OF MAKING FLUTE TUBE

[75] Inventors: Richard S. Preston, Atascadero; Steven Parkinson, Fountain Valley; Edwin Hinkley, Riverside; Dale Cook, Lake Forrest; Keith Mason, Fullerton, all of Calif.

[73] Assignee: Astech/MCI Manufacturing, Inc., Santa Ana, Calif.

[21] Appl. No.: 108,055

[22] Filed: Aug. 17, 1993

[51] Int. Cl.⁶ .............................................. B01J 35/02
[52] U.S. Cl. .................................... 228/181; 29/890
[58] Field of Search ............... 228/173.6, 181; 29/890

[56] References Cited

U.S. PATENT DOCUMENTS

| | | | |
|---|---|---|---|
| 3,966,646 | 6/1976 | Noakes et al. | 72/147 X |
| 4,186,172 | 1/1980 | Scholz | 29/890 X |
| 4,300,956 | 11/1981 | Rosenberger | 72/147 X |
| 5,153,167 | 10/1992 | Saito et al. | 502/439 |

Primary Examiner—Kenneth J. Ramsey
Attorney, Agent, or Firm—Hawes & Fischer

[57] ABSTRACT

A fluted tube, defined by a multiplicity of parallel flutes extending over the length of the tube, is constructed by providing a flat portion of sheet metal, forming a series of undulations in one portion to form a corrugated section which is allowed to adjoin and be continuous with a flat section at a transition line or point. The sheet is engaged with tynes at the transition point and simultaneously welded as it is rolled into a spiral to form a multiplicity of flutes each bound by an undulation and a portion of the flat sheet metal. The flat sheet section can have a sufficient length so that it defines the last exterior layer of the spirally wound fluted structure to form a smooth walled, tubular envelope.

18 Claims, 3 Drawing Sheets

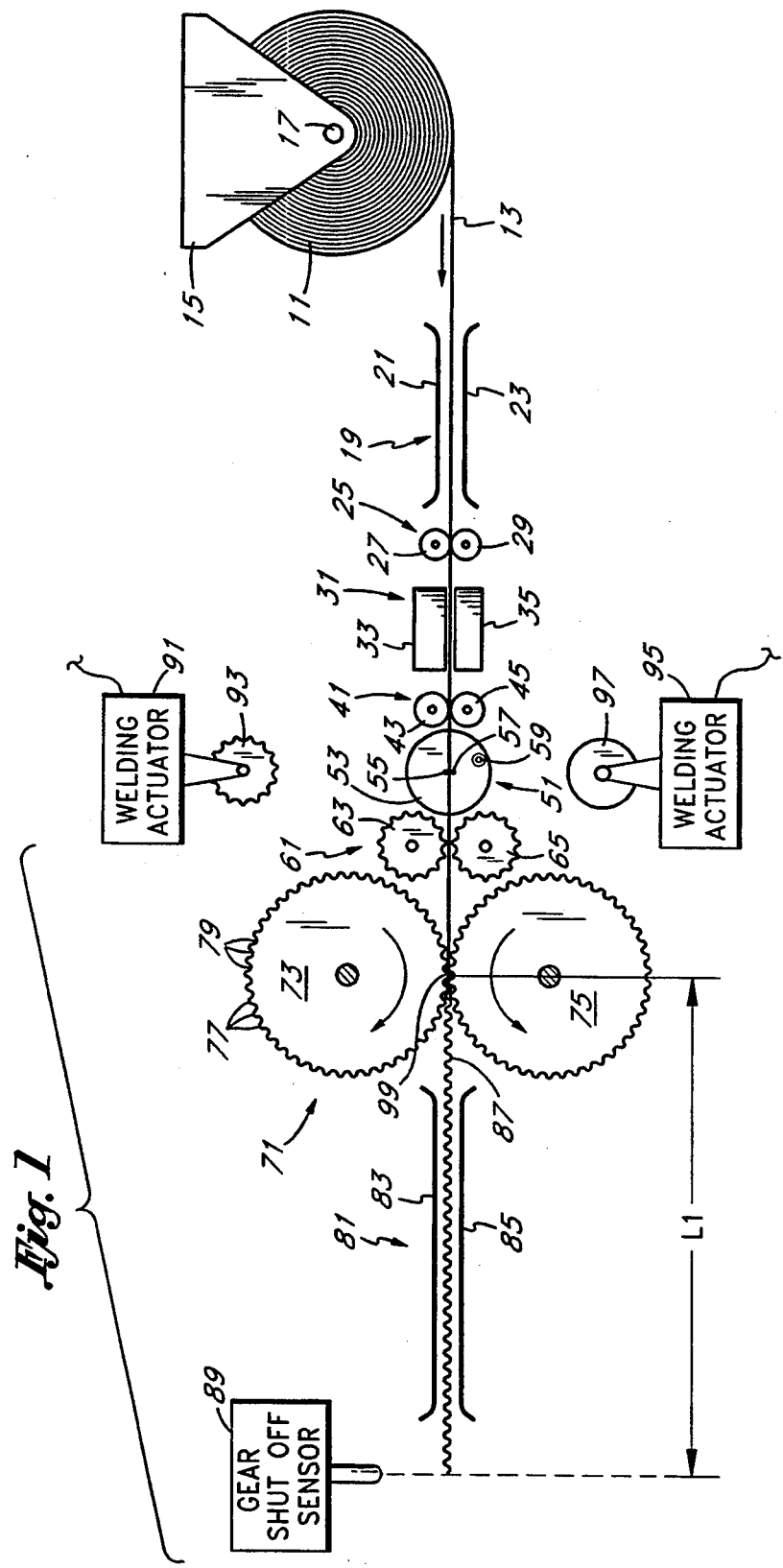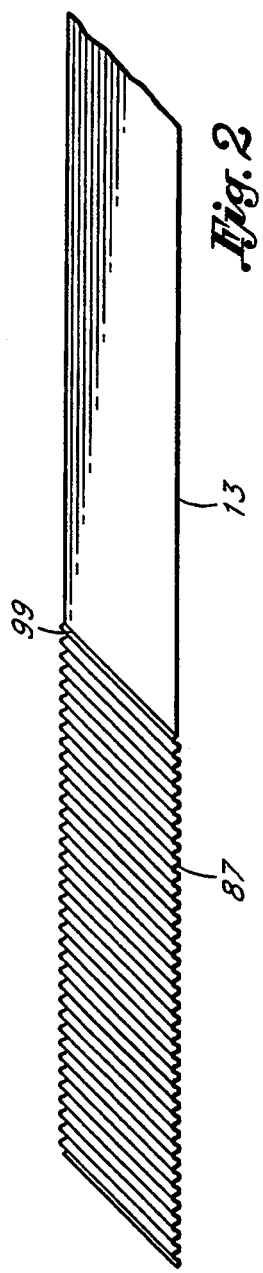

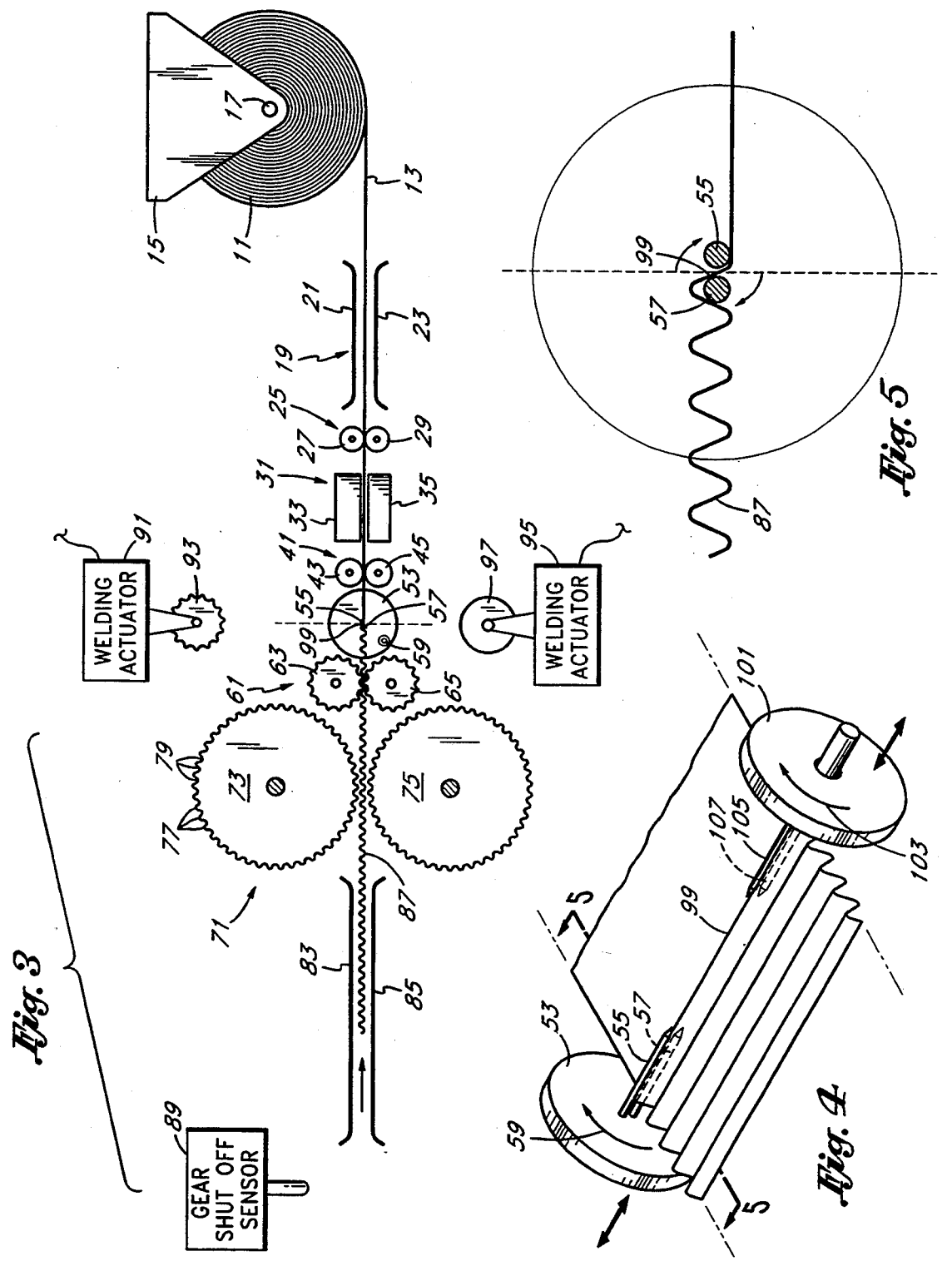

5,402,928

METHOD OF MAKING FLUTE TUBE

BACKGROUND OF THE INVENTION

The present invention relates to an advantageous method of joining areas of dissimilarly shaped members without the need to initially use a spool to begin joinder of the materials. More specifically the invention relates to a quick efficient way to form flute tube having an expanded internal surface area and which is particularly useful when used as a support for a catalyst in a catalytic converter, due to its ability to withstand high temperatures.

It is sometimes necessary to internally fit tubular members with a fluted structure having multiplicity of adjoining, parallel but separated conduits, or flutes, which extend over the full length of a fluted structure to form "fluted tubes" which are useful as flow straighteners and enhanced surface area providers for passing fluids therethrough.

Such a fluted structure has found wide acceptance as a substrate for the strategic elements for the catalytic conversion of noxious components of waste gases, more commonly known as "catalytic converters" which are in wide-spread use in the exhaust systems of internal combustion engines. The efficient, low-cost and high quality production of such a fluted structure is not simple.

Problems arise where the layers of the fluted tubing tend to telescope or extrude axially. Once this occurs, the metal supported catalyst will not remain intact simply under its own winding tension. The use of retaining bars to check the tendency of the fluting to extrude are undesirable due to the added weight as well as the added perturbation of the gas flow.

In one attempt, exemplified by U.S. Pat. No. 4,521,947, issued to Nonnenmann et al on Jun. 11, 1985, and entitled "Method for Manufacturing a Catalytic Reactor Matrix," a fluted tube is constructed by simultaneously winding together a corrugated sheet, a flat sheet, a first pair of soldering bands, and a second pair of soldering bands about a mandrel to form a spirally wound fluted core. The flat and corrugated sheets are soldered to each other to complete the manufacturing process. A serious drawback encountered with this manufacturing process is that it leaves open an undesirable, large center or mandrel core hole. The core hole was necessary to support the sheets during spot welding and because it was difficult or impossible to commence the simultaneous winding of the two sheets without first forming the center hole.

An additional piece, namely a fluted core must then be inserted in a cylindrical envelope, or tube, and secured by a technique such as by soldering the outer portion of the fluted structure to the inside of the tube to form a complete fluted structure. A further shortcoming of the process disclosed in the '947 patent is that the sheets must be soldered to each other, apparently because conventional spot welding techniques cannot be employed since there is neither time nor room for positioning the required electrical spot welding equipment given the relatively large numbers of layers which are formed simultaneously.

In U.S. Pat. No. 4,300,956, issued on Nov. 17, 1981 to Rosenberger et al, entitled "Method of Preparing a Metal Substrate for Use in a Catalytic Converter," a method of co-winding intercalated layers of corrugated and noncorrugated fecralloy sheets is taught. Also taught is the wash coating technique of applying catalysts to the metal substrate. An alumina coat is applied in order to have a surface rough enough to cause a catalyst to adhere. It is also taught that the adhesion of the alumina coat is dependent on the tension to which the metal which underlies the coat is subjected during formation. In a typical roll, the greatest tension is at or adjacent the inner core due to the more highly angled turns, and decreases radially. The method disclosed for fixing the metallic portions of the fluted tubes together is soldering or brazing, which is performed with the additional step of after-heating the formed fluted structure.

U.K. Pat. 1,452,982, entitled "Catalytic Reactor Matrix for Cleaning Internal Combustion Engine Exhaust Gases and a Method of Manufacturing the Same," discloses the exposure of a corrugated and flat sheet of chromium nickel alloy to a coating bath before joining them together into a fluted structure.

The following additional patents represent the current state of the art with respect to the construction and manufacture of flute tubes and include U.S. Pat. Nos. 4,282,186; 4,381,590; 4,400,860; and 4,519,120.

SUMMARY OF THE PRESENT INVENTION

The present invention is directed to an improved method for the manufacture of a flute tube structure which eliminates the difficulties heretofore encountered. Generally speaking, the method of the present invention enables production of the flute tube structure from a single roll, preferably of large economical size, of flat metal. A first length of initially flat, elongated sheet is fed into the device of the present invention where it is partially corrugated over only a first section of its length so that undulations formed by the corrugating step extend transversely across the full width of a first section of the sheet, leaving a second section of the sheet, which may even extend back onto the roll in a smooth condition. The undulated or corrugated sheet section adjoins a flat portion of the same sheet at a transition point where the corrugating step was ceased.

The partially corrugated transition point is then moved slightly back to align with the center of a winding structure. The winding structure, similar to a pair of parallel pins, includes a pair of tynes which engage the sheet on either side of the transition point. Once engaged with the transition point, the winding structure begins to turn causing the first and second sections to be rotated about one another in a dual spiral. The axis of rotation is parallel to the undulations formed on the metal sheet. A multiplicity of flutes or conduits, each defined by an undulation and a portion of the flat sheet opposing the undulation, are thereby formed. The spirally wound flat and undulated sheet sections are secured to each other at points where they are in mutual contact by adhesive bonding, welding, spot welding, brazing or the like.

The flat and undulated sheet sections are simultaneously spirally formed with respect to each other to form a double spiral, rather than being wrapped together and then formed into a single spiral. To facilitate the spiral winding of the flat and corrugated sheet sections, and especially the beginning of the winding step, perforations can be formed parallel to the undulations and in close proximity to the axis of rotation. Alternatively, the corrugated and flat sheet sections may be separately formed and suitably secured to each other at spaced apart points prior to the winding step so as to reduce the sheet's resistance to the first, relatively sharp bend that is formed in the sheet at the commencement of the spiral winding.

Although the flat and corrugated sheet sections can be secured to each other with any one of several available techniques, as indicated above, in a preferred embodiment of the invention, the sheets are automatically secured to each other by electric resistance or capacitive discharge welding at a plurality of spaced apart points distributed over the length of contact between undulations of the corrugated sheet section and the flat sheet section, as the dual spiral structure is formed. The welding step is performed while the sheet sections are spirally wound about the axis of rotation. This rapid formation technique does not permit time to insert electrically conductive backup bars into the flutes being formed. However, applicant has determined that electric welding is nevertheless possible when performed simultaneously with the spiral windings because the fluted core has great resistance against bending as it is formed.

Resistance or capacitative discharge welding is made possible by employing a plurality of welding wheels, their axes being arranged parallel to the axis about which the sheets are rotated to both weld the flat and corrugated sheet sections into a composite and weld the composite into a spiral. One set of welding wheels, e.g., for forming the composite, has a circular periphery and engages the flat sheet section. The wheels of another set, e.g., for welding the spirals of the composite to each other, have projections on their peripheries which are formed to extend into the corrugations and engage the bottoms of the undulations which are in contact with the underlying flat sheet. Thus, by applying the necessary potential to the welding wheels, a current flows between the bases of the undulations and the flat sheet. This welds the two together with a plurality of extended area "spot welds" distributed over the length of the undulations. The electric potential may be pulsed by timing it so that it is applied only while the respective welding wheels overlie or extend into an undulation.

The present invention further contemplates the use of a flat sheet section of a length which may exceed that of the corrugated sheet section by at least about the length of the periphery of the fluted structure. The rotation of the sheet is continued after the entire length of the corrugated sheet has been spirally wound to thereby wrap the excess length of the flat sheet section about the fluted structure. A smooth, cylindrical, tubular envelope for the fluted structure is thereby wrapped about it during one manufacturing process. The envelope may be secured to the core, preferably by the same means by which the corrugated and flat sheet sections are secured to each other.

A fluted tube structure manufactured as above-described has a grid of parallel and uniform flutes which extend from the very center of the core to the periphery thereof. The heretofore troublesome open core hole encountered with flute tubes constructed in accordance with the prior art is thereby eliminated, as is the need for solder material to be engaged by heating. Further, since the sheet sections are welded to each other, the core has a much greater strength than prior art cores from the moment winding commences so that welding becomes possible even without employing the support bar which extends through the core hole.

Still further, in a single manufacturing step and requiring only slightly more than one additional revolution of the fluted core, a smooth walled, cylindrical envelope for the core is fabricated. The heretofore necessary tedious and time consuming insertion of the fluted core into an outer tube, as exemplified in the above-mentioned U.S. Pat. No. 4,521,947, for example, is thereby eliminated.

The present invention greatly simplifies material handling. Instead of requiring separate guidance and feeding mechanisms for aligning and bringing into mutual contact a flat sheet and a separate corrugated sheet, which is both difficult and costly, the present invention forms both flat and corrugated portion from a single length of sheet material such as steel, aluminum, stainless steel, copper, or the like. All that is required is that the sheet be grasped, for example with axially rotatable tynes at the flute which is next to the flat sheet section, and that the tynes be rotated. The sheet sections are automatically aligned, because they define a single sheet, and the winding mechanism is of a simple construction, conceptually requiring no more than a rotating mechanism and a way for preventing the free ends of the sheet from rotating with the tynes. In contrast thereto, prior art machines for forming fluted cores from two separate sheets require a guidance system for each sheet to separately convey them along different paths to the point where they are brought in contact with each other and wound about themselves.

As the foregoing demonstrates, the present invention provides a greatly simplified method for the manufacture of fluted tubes. Aside from reducing the cost of such tubes, the tubes themselves have greater utility because the heretofore unavoidable, large core holes are eliminated.

BRIEF DESCRIPTION OF THE DRAWINGS

FIG. 1 is a side elevation process schematic illustrating the processing and manufacture of a fluted structure according to the process and system of the present invention;

FIG. 2 is a perspective view of a length of sheet metal material which has had a portion of its length formed with corrugations;

FIG. 3 is a side elevation process schematic similar to that for FIG. 1, but illustrating the sheet of FIG. 2 in position to be formed into a fluted structure;

FIG. 4 is a perspective of the spindle portion of the system of the present invention illustrating engagement of the tynes and guide rims with respect to the sheet metal material shown in FIG. 2;

FIG. 5 is a sectional view taken along line 5—5 of FIG. 4 and illustrating the interaction of the tynes with the positioning point separating the corrugated portion and the smooth portion of the sheet metal (tynes may be located along the plane of the sheet);

DESCRIPTION OF THE PREFERRED EMBODIMENTS

Figure 6:
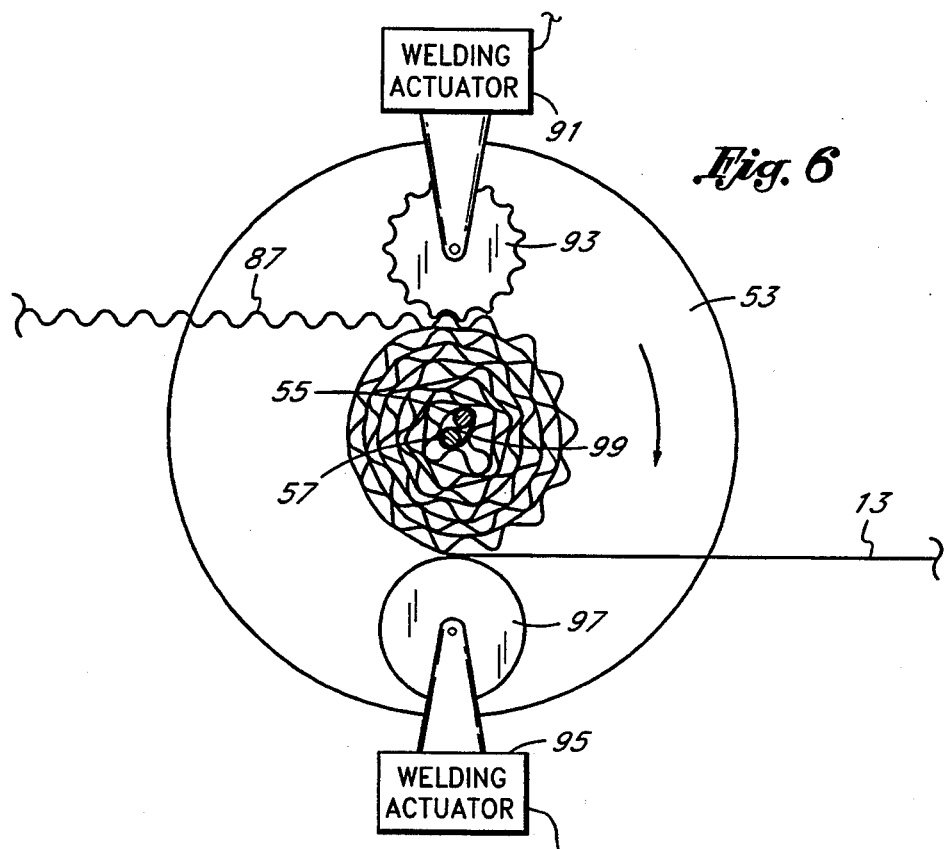
FIG. 6 is an enlarged side elevation process schematic similar to those of FIGS. 1 and 3 and emphasizing and illustrating the turning and welding operation which begins to form a fluted structure.

The process of the present invention will be shown semi-schematically to emphasize the breadth with which the processes can be performed. Further, the process of the present invention need not be practiced with a single multi function machine, although it is preferable to do so, and to perform the process of the present invention automatically, if possible.

Referring to FIG. 1, a schematic side view illustrating the processing of a sheet of metal includes several aspects and structures, all of which need not be simultaneously present. Beginning at the far right, a coil 11 of flat metal sheet 13 is rotatably supported by a bracket 15. The bracket 15 is shown as having a pin 17, or some other structure for rotatably mounting a coil 11 of metal sheet 13. Pin 17 may be the end of a rod passing through the coil 11, or coil 11 may be mounted on a roller (not shown) with the roller being further supported by a pin 17 of some type.

A coil 11 is shown because the flat metal sheet 13 is often available in coil 11 form, and where it is sought to fully automate the process, the use of the coil 11 facilitates such automation. The metal sheet 13 extends from the coil 11, through a guide structure 19, including upper guide 21 and lower guide 23. The guides 21 and 23 actually need not be upper and lower structures. It is possible that they be a U-shaped pinching structure engaging the sides of the metal sheet 13, or they may completely surround the perimeter of a length of metal sheet 13. The guides 21 and 23 are simply structures intended to keep the metal sheet 13 straight and to keep it from bending as it enters other processing areas.

Next, a pressure roller set 25, including an upper pressure roller 27 and a lower pressure roller 29, closely engage the metal sheet 13 and can provide resistance to the motion of the metal sheet 13 when it is passing through the machinery being described. Adjacent the rollers 27 and 29 is a notch forming device 31, possibly including an upper notch block 33 and a lower notch block 35. Notch forming device 31 contains other moving structure capable of cutting notches out of a portion of the metal sheet 13. The purpose of the notches will be outlined in detail later Next, a pressure roller set 41, including an upper pressure roller 43 and a lower pressure roller 45 closely engage the metal sheet 13 adjacent the notch forming device 31 and can also provide resistance to the motion of the metal sheet 13 when it is passing through the machinery being described, and is especially useful in combination with the pressure roller set 25 when a notch is being formed in the metal sheet 13.

Adjacent the pressure roller set 41, is a spindle 51, typically having a pair of outer guide rims 53 (one of which is shown), a first tyne 55, shown above the metal sheet 13 and a second tyne 57, shown below the metal sheet 13. An arrow 59 shown the direction in which the guide rim 53 is to be turned. Guide rim 53 and its function may be employed through the use of a gear, or a gear may be mounted with respect to the guide rim 53. In a fully automated configuration, the spindle 51 is operated automatically. A structure (not shown) to enable manual operation may be helpful in performing adjustments to the mechanism.

Note that the positioning of the tynes 55 and 57 are such that a turning motion of the spindle 51 would cause the metal sheet to be twisted about the tynes 55 and 57. In normal operation, the tynes 55 and 57 are removed axially from engagement with the metal sheet 13 during the time when the metal sheet 13 is first introduced into the structure of FIG. 1, and the metal sheet 13 does not normally move longitudinally between the tynes 55 and 57 during operation. Also, the tynes 55 and 57 may not necessarily extend across the whole length of the metal sheet 13, and may extend across the edges of the metal sheet 13 only as is necessary to effectively engage the metal sheet 13.

Adjacent the spindle 51 is a serrated set of tension gears 61. The tension gears 61 may include an upper serrated gear 63 and a lower serrated gear 65. As is the case for pressure roller sets 41, and 25, as well as tension gears 61, they may consist of one or more narrow circular structures on one side of a metal sheet 13, or they may consist of one single continuous cylindrical roller or gear for each side of the metal sheet 13. Typically the tension gears 61 will only be brought into engagement with the metal sheet 13 after it has been formed with undulations. Also, the pitch of the serrations on the tension gears 61 should be formed to match the undulations formed with the metal sheet 13.

Adjacent the tension gears 61 is a form gear set 71 including an upper form gear 73 and a lower form gear 75. The form gears 73 and 75 will extend the whole length across the metal sheet 13, in order to form undulations across the entire width of metal sheet 13. The form gears 73 and 75 should include structure which enables them to be selectively brought into intermeshing pressured rotational bearing with each other, and to be selectively be brought out of engagement with each other.

The form gears 73 and 75 have, from the cross sectional view of FIG. 1, peaks 77 and troughs 79 which represent the upper portions of ridges and the lower portions of the valleys which extending across the length of the form gears 73 and 75. The peaks 77 of form gears 73 and 75 should, within some limits allowing for the presence of the metal sheet 13 between them, intermesh with the troughs of the opposing one of the form gears 73 and 75.

To the left of the form gears 73 and 75 is another guide structure 81, including upper guide 83 and lower guide 85. Again, the guides 83 and 85 actually need not be upper and lower structures. Here, the guide structure is used to insure that the portion of the metal sheet 13 containing the undulations, hereinafter referred to as the corrugated portion 87 is kept straight.

Here, the corrugated portion 87 is kept straight to facilitate the measurement of the length of the corrugated portion 87 between the intermeshing portion of the form gear set 71 and a gear shut off sensor 89. Gear shut off sensor 89 is shown as detecting the extent of the corrugated portion 87 extending from the gear set 71 by breaking a light beam or using some other line of sight sensor. In an automated configuration, gear shut off sensor 89 is configured to detect a given length of the formation of the corrugated portion 87. The measurement of this length can be used to cease the powered engagement of the gear set 71.

Also shown in FIG. 1 is an upper welding actuator 91 having a gear wheel 93. Gear wheel 93 is serrated, similar to the serrations of upper serrated gear 63, generally matching the undulations formed in the corrugated portion 87 of the metal sheet 13. Similarly, and situated below the spindle 51 is a lower welding actuator 95 having a roller wheel 97. Roller wheel 97 is smooth and round since it is intended to engage the smooth metal sheet 13.

The operation of the device and method of the present invention is also best explained with reference to FIG. 1 also. Subsequent Figures will illustrate further details of the process, with emphasis being placed upon the structures introduced in FIG. 1. At the start of the process, the end of the metal sheet 13 is fed through the guide structure 19, pressure roller set 25, and pressure roller set 41. At this point in the process, the tension gears 61 should be unengaged with each other, and moved out of the way of the metal sheet 13 as it approaches the form gear set 71, as is shown in FIG. 1.

During the time in which the metal sheet 13 is fed into and through the structures on its approach to the form gear set 71, the form gear set 71 may be engaged and turning. As soon as the end of the metal sheet 13 reaches the form gear set 71, it is engaged by the upper and lower form gears 73 and 75 in a pinching action, and is drawn through the point of engagement between gears 73 and 75. As the end edge is drawn in, it begins to be compressed between the peaks 77 and troughs 79 of the upper and lower form gears 73 and 75 to begin to form the corrugated portion 87.

The corrugated portion 87 is formed between the upper and lower form gears 73 and 75 and continuously emerges from the form gear set 71 as it passes through the guide structure 81. Once the end of the corrugated portion 87 reaches the line of sight of the gear shutoff sensor 89, a signal is sent to the machinery operating the form gear set 71 to cause it to cease operation and to cause the upper and lower form gears 73 and 75 to separate. The boundary where the corrugated portion 87 meets the smooth portion of the metal sheet 13 is identified as the transition point 99. Although the transition point 99 is identified in FIG. 1, it is best seen with reference to FIG. 2. Once the upper and lower form gears 73 and 75 separate, the pressure roller sets 25 and 41 reverse direction to draw the metal sheet 13 back toward the coil 11. This motion continues until the transition point 99 is aligned with an axis midway between the axes of the tynes 55 and 57.

This is best illustrated with respect to FIG. 3. The configuration of a preferable tyne orientation is best shown with respect to FIG. 4. In addition to the outer guide rim 53 which was shown in FIG. 1, a second outer guide rim 101 is also illustrated. As was the case for guide rim 53, guide rim 101 and its function by be employed through the use of a gear, or a gear may be mounted with respect to the guide rim 101. A direction arrow 103 shows the direction of turning of the second outer guide rim 101. In addition to the tynes 55 and 57 which were seen in FIGS. 1, 3, and 4, the tynes 105 and 107 can now be seen. Since the perspective of FIG. 4 is from an upward position, the tynes 57 and 107 are shown in phantom.

As can be seen, tyne 55 shares a common axis with tyne 105, while tyne 57 shares a common axis with tyne 107. In an automated configuration, the tyne pairs 55/57 and 105/107 can be made to be axially moveable in order to move toward metal sheet 13 for engagement, and away from metal sheet 13 for disengagement. The apparatus seen in FIG. 1-3 has aspects which enable it to be used on either a more automated or less automated scale. The tynes 55, 57, 105, and 107 have pointed ends to facilitate the axial engagement with the metal sheet 13.

FIG. 3 illustrates the metal sheet 13 having been reversed in motion through the pressure roller sets 25 and 41 until the transition point or line 99 is aligned with an axis midway between each set of tynes 55/57 and 105/107. Once this occurs, the tynes 55 and 57 are brought toward the transition line 99, engaging the upper and lower portion of one side of the metal sheet 13. Similarly, the tynes 105 and 107 are brought toward the transition line 99, engaging the upper and lower portion of the other side of the metal sheet 13. The tynes 55/57 and 105/107 are inserted toward the side edge of the metal sheet 13 until the outer rim guides 53 and 101 engage the side edges of the metal sheet 13.

These outer rim guides 53 and 101 help to align both the corrugated portion 87 and the smooth portion of metal sheet 13 as they are being formed into the flute structure. Once the tynes 55/57 and 105/107 are engaged, the tynes 55/57 begin to revolve in synchronization with the tynes 105/107. Synchronization is important because it is undesirable to wind the metal sheet 13 at an uneven rate.

In FIGS. 4 and 5, the metal sheet is shown as being wound in the clockwise direction. The direction of wind is not important in itself, but it is important with regard to the location of the welding actuators 91 and 95. In the configuration of FIGS. 4 and 5, it can be seen that a clockwise wind will expose the undulated portion of the metal sheet 13 upwardly to the welding actuator 91 and its gear wheel 93. In this manner, the gear wheel 93 will "fit" the undulations of the corrugated portion 87 of the metal sheet 13 exposed to it. Likewise, a clockwise wind will expose the smooth lower portion of the metal sheet 13 downwardly to the welding actuator 95 and its roller wheel 97. In this manner, the roller wheel 97 will smoothly and continuously follow the smooth surface of the uncorrugated, smooth surface of the metal sheet 13 exposed to it.

Having continuous exposure on both the corrugated surfaces 87 and the smooth portion of the metal sheet 13 is desirable. Typically, the upper and lower welding actuators 91 and 95 and their gear 93 and wheel 97 need to have close, continuous contact to ensure a continuous weld across the width of the metal sheet 13. As the spindles 51 and 101 begin to wind, as is shown in FIG. 5, the smooth surface of the metal sheet 13 will come into contact with the peaks of the corrugated portion 87 of the metal sheet 13. The contact between the smooth surface of the metal sheet 13 and the corrugated portion 87 of the metal sheet will be along the outer surfaces of the peaks of the corrugated portion 87 of the metal sheet (and extending completely along the width of the metal sheet) and the areas of contact with the smooth portion of the metal sheet 13 which is in contact with the peaks. Contact is important since resistance welding will be employed in welding the corrugated portion 87 to the smooth portion of the metal sheet 13, which requires good contact at the inside of each peak to enable a good weld to be made from the outside of each peak to the portion of the flat metal sheet 13 which it contacts. The Welding frequency may be increased from 60 cycles (Hz) to 400 cycles (Hz) or higher as winding speeds are increased for greater productivity.

Just before the winding process shown in FIG. 5 begins, the welding actuators 91 and 95 are brought into contact with the metal sheet 13 at points adjacent the transition point 99. The gear wheel 93 is brought into contact with the corrugated portion 87 of the metal sheet while the roller wheel 97 is brought into contact with the smooth portion of the metal sheet 13, and the power is applied to the welding actuators 91 and 95.

As the spindles 51 and 101 turn, the welding process continues uninterrupted. As the spindles 51 and 101 continue to turn, an ever increasing mass of welded material is added to the tynes 55/57 and 105/107. The gear wheel 93 and the roller wheel 97 are both mounted to keep sufficient pressure on the growing radial extent of material, yet be radially outwardly displaced with respect to the axis of rotation of the tynes 55/57 and 105/107 so as not to bind with the structure supporting the welding gear wheel 93 and the welding roller wheel 97.

The system is set up electrically such that the maximum current flows through the areas of contact between the corrugated portion 87 and the smooth portion of the flat metal sheet 13. Referring to FIG. 6, a close up view of spindle 51, one of the outer guide rims 53 and the first and second tynes 55 and 57 are shown. The gear wheel 93 is shown engaged with the corrugated portion 87 of the metal sheet 13, while roller wheel 97 is shown engaged with the smooth portion of the metal sheet 13.

As can be seen from FIG. 6, the current flow occurs most sharply through an area of contact of an extreme extent of the undulation of corrugated portion 87 at the point of contact with the smooth portion of the metal sheet 13.

At the top of FIG. 6, current most readily flows from the gear wheel 93 through the corrugated portion 87. Current may also flow from the gear wheel 93 and into the smooth portion of the metal sheet 13 surrounding the growing fluted structure. At the bottom of FIG. 6, current most readily flows from the roller wheel 97 through the smooth portion of sheet metal 13. Current may also flow from the roller wheel 97 and into the corrugated portion 87 of the metal sheet 13 surrounding the growing fluted structure. In both cases, the maximum current flow occurs at or near the point where an extreme extent of the corrugated portion 87 touches the smooth portion of sheet metal 13.

As the fluted structure continues to turn, it is welded as it turns. If the lengths of the corrugated portion 87 equals the length of the smooth portion of the sheet metal 13, the welding operation will cease nearly simultaneously with respect to the welding gear 93 and the roller wheel 97. However, if a greater length of the smooth portion of the sheet metal 13 is provided, the welding operation will continue at the lower portion of FIG. 6 until the exterior of the corrugated portion 87 is surroundably covered by the flat portion of the sheet metal 13. In Such a case, a small portion of the flat portion of the sheet metal 13 may be welded to itself to insure complete enveloping coverage of the fluted structure by the smooth metal sheet 13.

Figure 7:
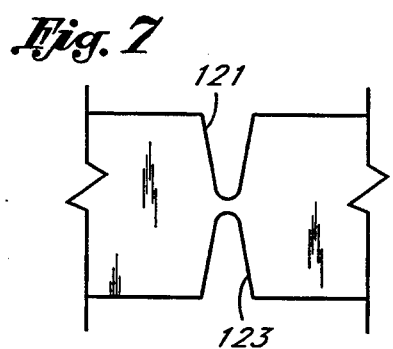
FIG. 7 is a plan view of a first possible notch configuration formable with the notch forming blocks shown in FIGS. 1 and 3.
Figure 8:
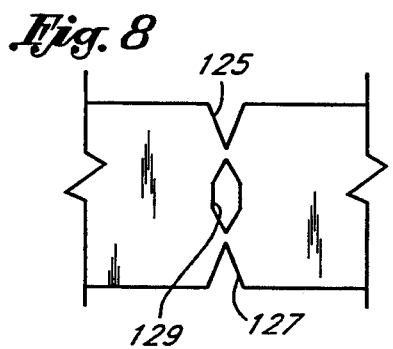
FIG. 8 is a plan view of a second possible notch configuration formable with the notch forming blocks shown in FIGS. 1 and 3.

Previously shown in FIGS. 1 and 3 was the notch forming device 31. FIGS. 7 and 8 illustrate two examples of patterns of notches which could be formed by the notch forming device 31. FIG. 7 illustrates an opposing pair of notches 121 and 123 separated by a single area of connecting material.

FIG. 8 illustrates an opposing pair of notches 125 and 127 which do not extend as far as the notches 121 and 123 into the area of the sheet metal 13. An aperture 129 is formed at the center of the sheet metal 13 which, in combination with the notches 125 and 127, defines a pair of areas of connecting material.

The notches provide several useful features. First, with the use of the notch forming device 31, the machinery depicted in FIGS. 1 and 3 can be automated to form the notches 121, 123, 125, and 127. Automated formation of the notches 121, 123, 125, and 127 can be used to alert the machine operator as to where to sever the flat portion of the sheet metal 13. Notches 121, 123, 125, and 127 could also facilitate the machine cutting or severing of the sheet metal 13, especially when welding is terminated and the severing occurs between the fully completed fluted structure and a length of flat sheet metal 13. It should be noted that once the notches 121, 123, 125, and 127 have been used in assisting the severance of the flat portion of the sheet metal connected to the formed fluted structure, the end may require some further finishing so that it will be linear and provide a suitable termination for the end of the corrugated section 87 which will lie at the outermost periphery of the fluted structure formed in the next operation. Alternatively, the end formed by use of the notches 121, 123, 125, and 127 may be used for easier compression at the outer periphery of the fluted structure at the point where the severed notch portions terminate, since a tapering end of the corrugated section 87 may compress more readily. Alternatively, the undulations of the corrugated portion 87 of the sheet metal 13 may be purposefully formed to decrease in height over a relatively short distance from the free end of the corrugated portion 87. This decrease in the undulation height provides support for the overlying flat portion of the sheet metal 13 forming the outer smooth walled cylindrical envelope for the fluted structure 131.

Figure 9:
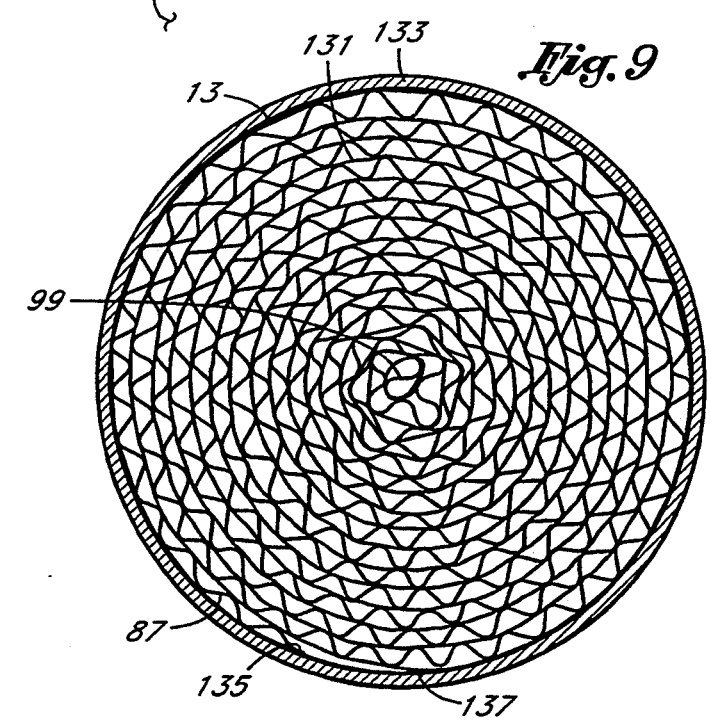
FIG. 9 is an axial view of the fluted structure formable with the method and system of the present invention shown in place within a separately formed conduit.

Referring to FIG. 9, a completely formed fluted structure 131 is shown as being encased within a separate conduit 133. Although the separate conduit 133 is prominent, the details regarding the complete encirclement of the corrugated section 87 by the flat portion of the metal sheet 13 is still seen. Near the bottom most portion of FIG. 9 is seen the end 135 of the corrugated section 87. The end 135 is adjacent a concentrically inwardly disposed flat portion of sheet metal 13 and adjacent a concentrically outwardly disposed flat portion of sheet metal 13 which terminates against the concentrically inwardly disposed flat portion of sheet metal 13 at a radial position about three to six degrees counterclockwise from the end 135 of corrugated section 87, at a point referred to as a radial closure point 137. Radial closure point 137 is in fact a closure line extending parallel to the axial center of the fluted structure 131.

Note that the fluted structure 131 could be formed with an exposed layer of corrugated section 87. The fluted structure 131 would still be effectively utilizable by placement within a separate conduit 133. However, greater frictional fixation within the separate conduit 133 can be had when the outer layer of the fluted structure 131 is made of the flat portion of sheet metal 13, due to the increased surface area available for attachment to the inner surface area of the separate conduit 133.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

I claim:

1. A method for making a fluted core comprising the steps of:
   providing an elongated, corrugated sheet portion having a multiplicity of undulations oriented substantially perpendicular to the length of the sheet and extending over its full width;
   providing a flat sheet portion having an end adjacent an end of the corrugated sheet;
   rotating the adjacent ends of the flat and corrugated sheet portions about an axis parallel to the undulations to form a spiral core having a multiplicity of spirally arranged, axially extending flutes, each defined by an undulation of the corrugated sheet portion and a length of the flat sheet portion; and,
   passing an electric current between multiple, spaced apart points distributed over the length of contact between the undulations of the corrugated sheet portion and the flat sheet portion, while the sheet portions are being rotated, to thereby weld the sheet portions to each other to form a fluted core.

2. A method according to claim 1 including the step of connecting the adjacent ends of the sheet portions to each other before said rotating step.

3. A method according to claim 1 wherein said flat sheet portion is longer than the corrugated sheet portion by at least an amount necessary to cylindrically cover the corrugated sheet portion.

4. A method according to claim 1 wherein said passing an electric current step is performed with resistance welding.

5. A method according to claim 4 wherein said passing an electric current through the undulations of the corrugated sheet portion is performed with at least one welding wheel having projections on its periphery to extend into the corrugations.

6. A method according to claim 1 wherein the rotating step is performed while the flat sheet portion and the corrugated sheet portion are under tension.

7. A method according to claim 1, including the step of perforating the sheet portion parallel and in close proximity to an undulation proximate the flat sheet portion to thereby facilitate the spiral winding of the sheet section.

8. A method according to claim 1 and further comprising the step of aligning a transition from the corrugated sheet portion and the flat sheet portion with structure for engaging the transition, before the rotating step.

9. A method according to claim 8 wherein the structure for engaging the transition is at least a pair of tynes and where the tynes are used in the rotating step.

10. A method according to claim 1 wherein the corrugated sheet portion is formed with a pair of oppositely situated forming rollers.

11. A method for making a generally tubular, longitudinally fluted core comprising the steps of:
    forming an elongated, corrugated first portion of a sheet having a multiplicity of transversely oriented, adjoining, substantially parallel undulations extending across a width of the first portion of a flat sheet, to thereby leave a second portion of said flat sheet non-corrugated;
    rotating the sheet about an axis which is parallel to the undulations and near the transition to form a spiral pattern of flutes; and
    welding the first portion of the sheet to the second portion of the sheet while rotating the sheet.

12. A method according to claim 11 wherein the welding is high frequency welding performed at a frequency in excess of 300 hertz.

13. A method according to claim 12 and wherein the high frequency welding is performed with at least one welding wheel and where at least one welding wheel has a periphery substantially complimentary with the surface of the first corrugated portion of the sheet.

14. A method according to claim 12 and wherein the high frequency welding is performed with at least one welding wheel with a flat periphery profile welding the flat sheet portion to the corrugated sheet portion and at least one welding wheel has a periphery profile enabling welding of the corrugated sheet portion to the flat sheet portion.

15. A device for forming a fluted structure comprising:
    housing means for providing strength and support;
    form impression means, supported by the housing means, for accepting a length of metal sheeting and impressing an undulating pattern on a first length of the metal sheeting, leaving a second length of the metal sheeting free of undulations;
    guide roller means, supported by the housing means, for guiding and moving the metal sheeting with respect to the housing means;
    rotation means for engaging the metal sheeting at a position near a boundary between the first and second lengths of the metal sheeting, and for twisting the first and second lengths of the metal sheeting into a spiral pattern, the spiral path radially increasing in a direction perpendicular to the axis of said undulations; and
    automatic welding means, for contact welding at least the first length of the metal sheeting when supported by the rotation means.

16. A device for forming a fluted structure as recited in claim 15 and further comprising:
    automatic length measuring means, adjacent the housing means, for detecting the amount of the first length of the metal sheeting; and
    control means, connected to the automatic length measuring means, for ceasing the impression of an undulating pattern on the metal sheeting once the amount exceeds a pre-determined amount.

17. A device for forming a fluted structure as recited in claim 16 wherein the control means is also for controlling the guide roller means to align a transition between the first and second length of the metal sheeting with the rotation means; for controlling the rotation means once the transition is aligned; and for controlling welding during rotation.

18. A method according to claim 15, wherein the automatic welding means is high frequency welding means.

* * * * *